United States Patent
Kwong et al.

(10) Patent No.: US 9,632,852 B2
(45) Date of Patent: Apr. 25, 2017

(54) DETECTING AND MANAGING FLOODING OF MULTI-TENANT MESSAGE QUEUES

(71) Applicant: salesforce.com, inc., San Francisco, CA (US)

(72) Inventors: Hui Lam Kwong, Danville, CA (US); Xiaodan Wang, Dublin, CA (US); Vipul Modani, San Franicsco, CA (US); John B. Buisson, Largo, FL (US)

(73) Assignee: SALESFORCE.COM, INC., San Francisco, CA (US)

( * ) Notice: Subject to any disclaimer, the term of this patent is extended or adjusted under 35 U.S.C. 154(b) by 78 days.

(21) Appl. No.: 14/661,206

(22) Filed: Mar. 18, 2015

(65) Prior Publication Data

US 2016/0055042 A1    Feb. 25, 2016

Related U.S. Application Data

(60) Provisional application No. 62/041,212, filed on Aug. 25, 2014.

(51) Int. Cl.

| | |
|---|---|
| G06F 3/00 | (2006.01) |
| G06F 9/44 | (2006.01) |
| G06F 9/46 | (2006.01) |
| G06F 13/00 | (2006.01) |
| G06F 9/54 | (2006.01) |
| G06F 9/50 | (2006.01) |

(52) U.S. Cl.
CPC ............ G06F 9/546 (2013.01); G06F 9/5083 (2013.01)

(58) Field of Classification Search
CPC ...................................... G06F 9/546

USPC ......................................................... 719/314
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |

(Continued)

*Primary Examiner* — Timothy A Mudrick
(74) *Attorney, Agent, or Firm* — Schwabe Williamson & Wyatt

(57) ABSTRACT

A messaging system implements messaging among application servers and databases, utilizing other servers that implement messaging brokers. A large flood of incoming messages can bring down messaging brokers by overflowing the message queues, negatively impacting performance of the overall system. This disclosure in some embodiments detects and identifies "flooders" in a timely manner and isolates their message traffic to dedicated queues to avoid impacting other system users. Subsequently, a preferred system de-allocates the queues and returns the messaging system to normal operation when flooding conditions subside, and "sweeps" up any remaining orphan messages.

20 Claims, 8 Drawing Sheets

(56) References Cited

U.S. PATENT DOCUMENTS

| | | |
|---|---|---|
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zuckerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |

(56) References Cited

U.S. PATENT DOCUMENTS

| | | | |
|---|---|---|---|
| 2011/0247051 A1 | 10/2011 | Bulumulla | |
| 2011/0265088 A1* | 10/2011 | Devadhar | G06F 9/505 718/102 |
| 2012/0042218 A1 | 2/2012 | Cinarkaya | |
| 2012/0163178 A1* | 6/2012 | Gordon | H04L 47/24 370/237 |
| 2012/0233137 A1 | 9/2012 | Jakobson et al. | |
| 2012/0290407 A1 | 11/2012 | Hubbard et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya | |
| 2014/0359537 A1 | 12/2014 | Jackobson et al. | |
| 2015/0020196 A1* | 1/2015 | Wijbrans | H04L 51/12 726/22 |

* cited by examiner

MESSAGE QUEUE DEPTH CACHE ENTRY

| TIMESTAMP: 1/19/2015 15:04:09:17 | | |
|---|---|---|
| BROKER | QUEUE NAME | QUEUE DEPTH |
| BrokerA | Q37 | 1000 |
| BrokerB | Q91 | 25000 |
| BrokerC | Q5 | 100 |

DETECTING AND MANAGING FLOODING OF MULTI-TENANT MESSAGE QUEUES

RELATED APPLICATIONS

This application is a non-provisional of U.S. Provisional Patent Application No. 62/041,212—filed Aug. 25, 2014 and incorporated herein by this reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

The technology disclosed herein relates to managing message queues in a database system having a message queue system that includes queues shared by multiple message types and/or tenants.

BACKGROUND

"Cloud computing" services provide shared resources, software, and information to computers and other devices upon request or on demand. Cloud computing typically involves the over-the-Internet provision of dynamically-scalable and often virtualized resources. Technological details can be abstracted from end-users, who no longer have need for expertise in, or control over, the technology infrastructure "in the cloud" that supports them. In cloud computing environments, software applications can be accessible over the Internet rather than installed locally on personal or in-house computer systems.

In some networked environments, including without limitation a cloud environment, a plurality of application servers may be deployed to execute applications and for other functions. Workloads may be distributed across the application servers to improve performance for multiple concurrent user organizations or individuals. Facilitating the queuing, scheduling, and execution of jobs or messages from the workload may be realized in an application layer, for example, using a message queue framework.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for detecting flooding of message queues.

Example System Overview

Figure 1A:
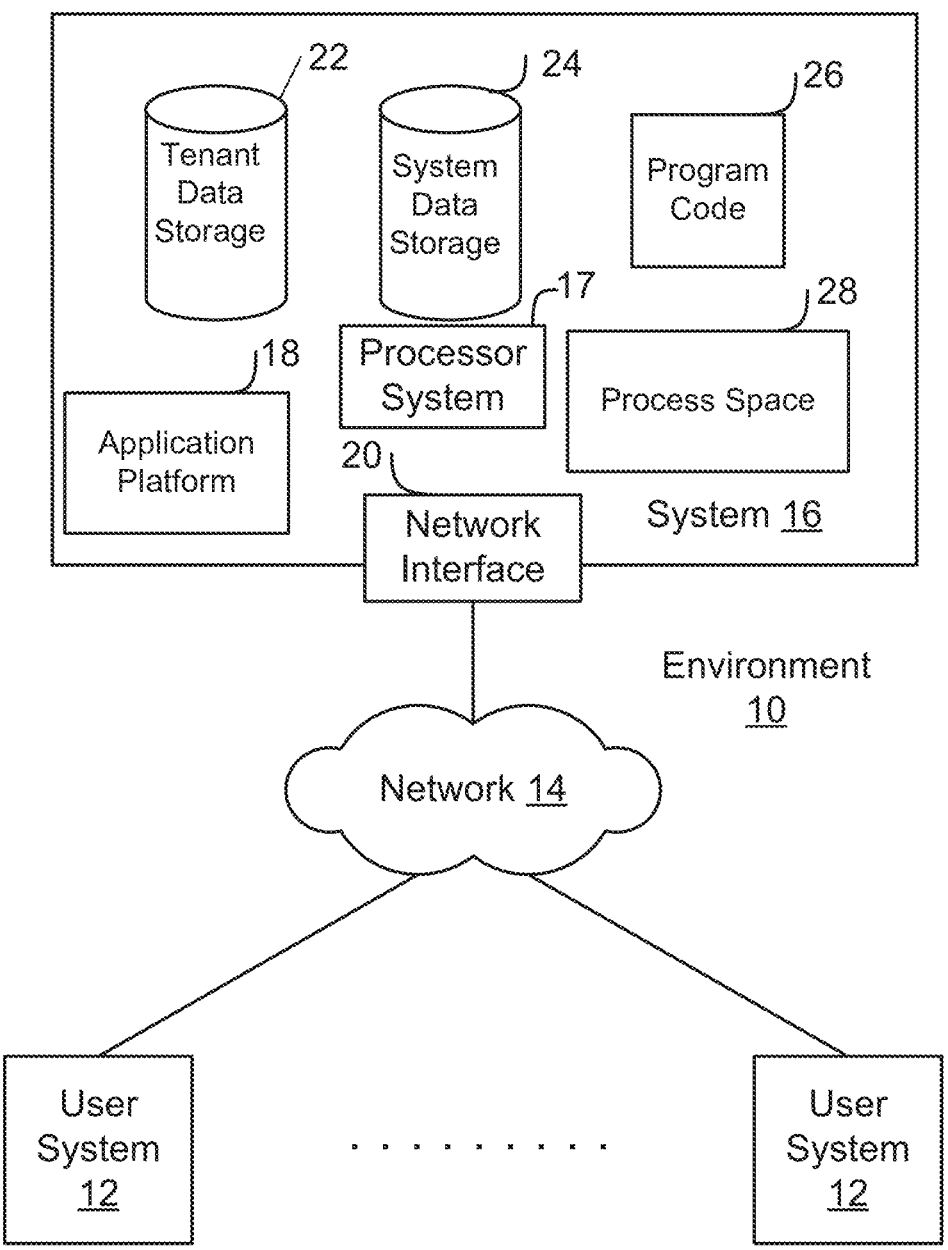
FIG. 1A shows a block diagram of an example environment in which an on-demand database service can be used according to some implementations.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications. Applications may be developed by the provider of the on-demand database service, by users accessing the on-demand database service via user systems 12, or by third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 may be configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a wearable device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
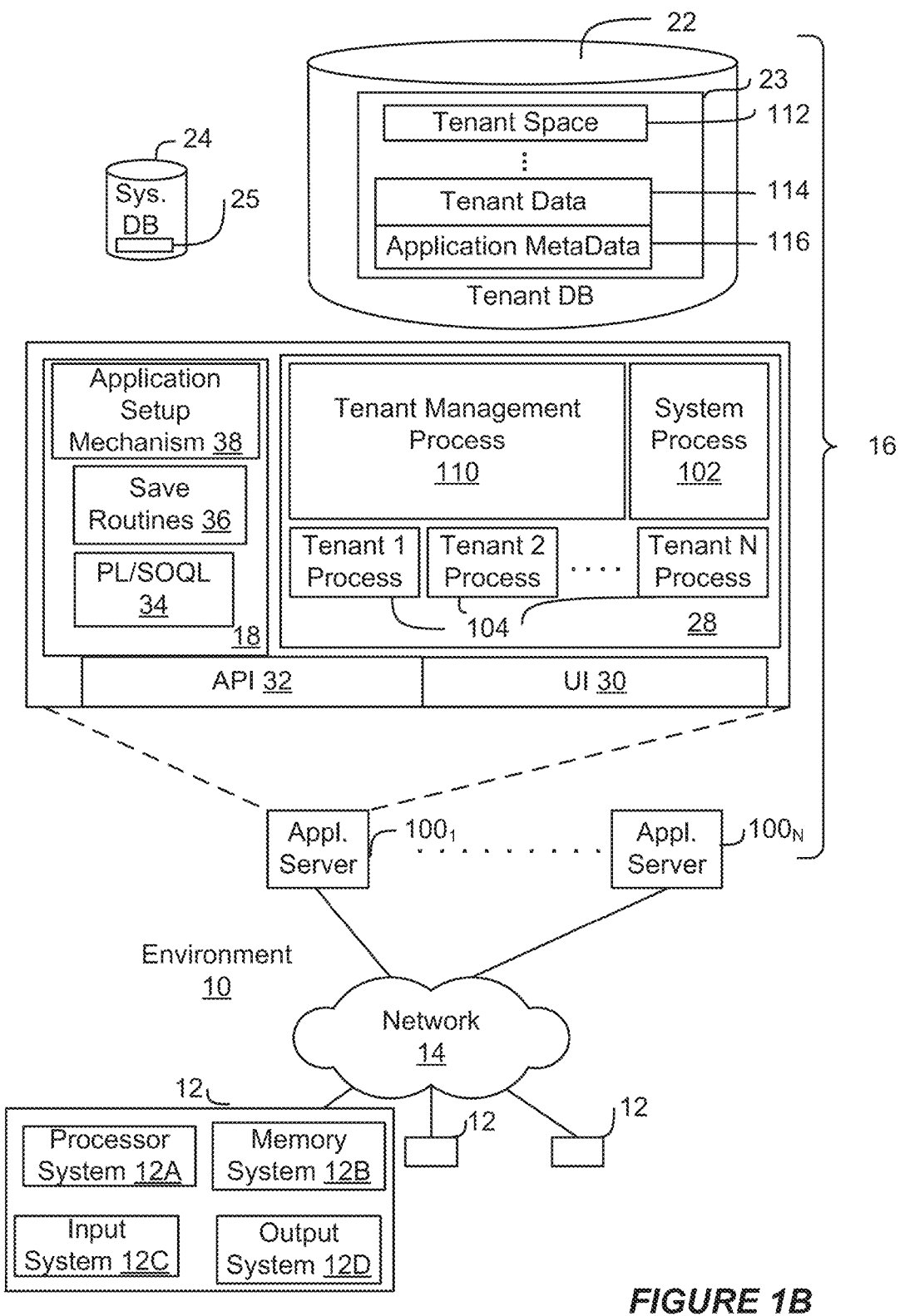
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

In some implementations of a cloud-based system, or other on-demand service, many of the various processes, including for example, system processes 102 and individual tenant processes 104, may submit messages (aka tasks) to the message queue system. Messages or tasks may involve a wide range of activities; for example, generating monthly sales reports or updating the contact information for a list of clients, just to name a few. Message queue provides a system to queue, schedule and execute these messages in an asynchronous manner. That is, the tenant submitting the message need not wait for the execution and completion of the message. A message "sender" can send a message into the messaging system, and then proceed to other tasks without having to wait for a reply. Similarly, a receiver may receive the message at a later time without direct interaction with the sender. In some systems, some messages may be processed by a "message broker" which is an entity responsible for receiving the message, holding it until delivery, and delivering it to the appropriate receiver(s). Various messaging protocols may be used. One example is an open standard application layer protocol called the Advanced Message Queuing Protocol (AMQP), wire-level protocol. Apache Qpid™ among others provide messaging tools that implement the AMQP protocol. We will use the term Qpid (pronounced "Cupid") herein to mean any messaging protocol or system.

A message broker may store pending messages in a broker queue. In computer science, a queue in general is a particular kind of collection in which entities in the collection are kept in order and the principal operations on the collection are the addition of entities to the rear terminal position, known as enqueue, and removal of entities from the front terminal position, known as dequeue. In such a first-in-first-out (FIFO) data structure, the first entity added to the queue will be the first entity to be removed, such that once a new entity is added to a queue, all entities that were previously added to the queue before have to be removed from the queue before the new entity can be removed from the queue. Queues may be implemented, for example, as data structures coupled with access routines, as an abstract data structure or in object-oriented languages as classes. Queuing messages is just one function of the message queue system in the context of its broader mission as a distributed system that preferably coordinates between application servers, database, and messaging brokers to perform queuing, scheduling, and execution of messages.

In some systems, messaging may be used, for example, for inter-process communication, or for inter-thread communication within the same process. Message queues may be used for messaging, the passing of control or passing of content. In some systems, millions or even tens of millions of messages may be in process or "queued" at a given time. As systems and services grow and evolve, the numbers of messages may grow potentially on the order of a billion messages, and threaten to overwhelm the messaging brokers working to handle the messages. Particular use cases also may cause "flooding" such as, for example, migration events and disaster recovery.

Figure 2:
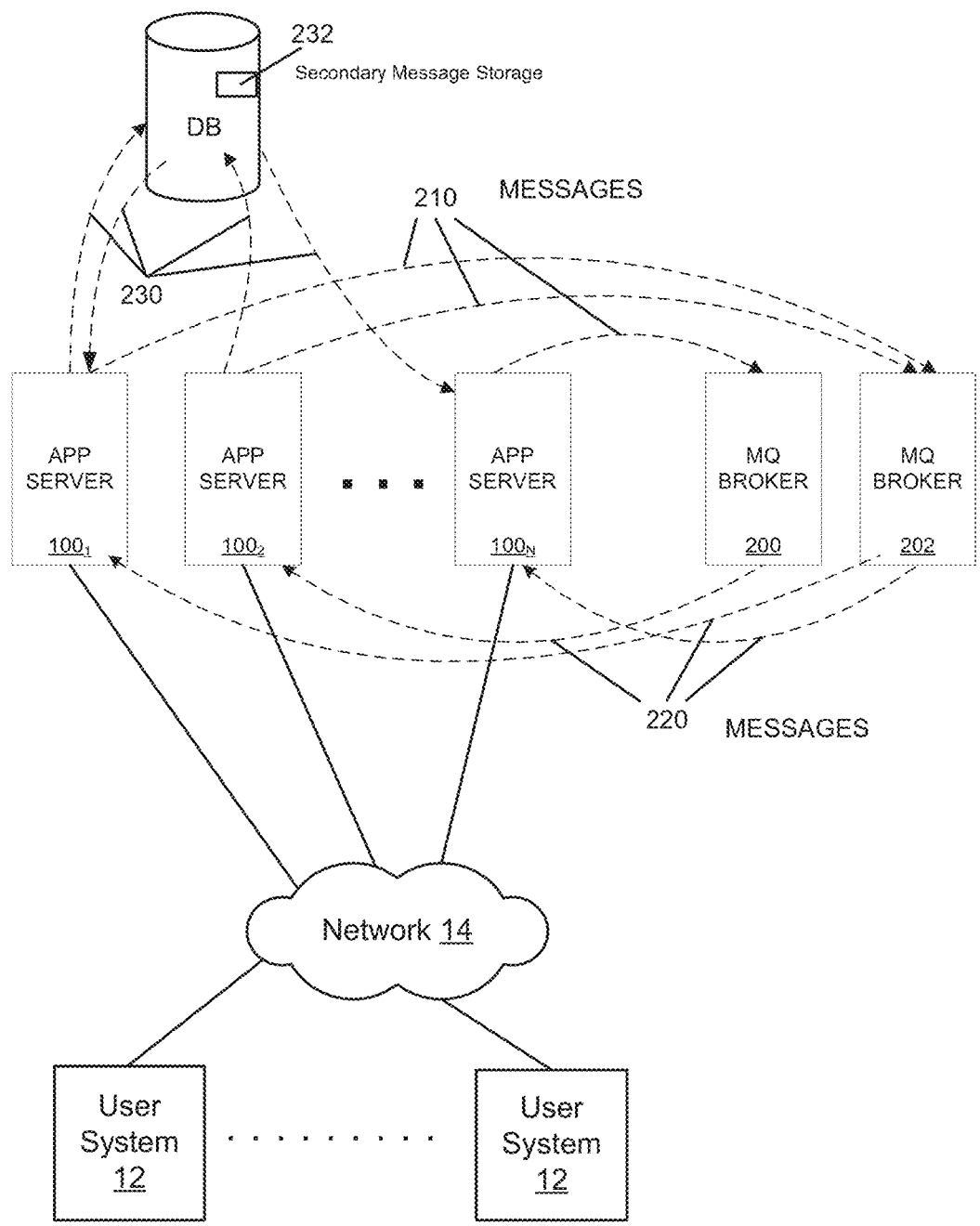
FIG. 2 is a block diagram of an example environment including a message queue system according to some implementations.

Referring now to FIG. 2, as a simple illustration, a series of application servers $100_1$ to $100_N$ are shown along with a pair of message brokers 200, 202 implemented on separate message queue host servers. The drawing illustrates messages 210 passing from the app servers to the message brokers 200, 210, and messages 220 being delivered from the message brokers to the app servers. Further, the drawing illustrates some messages 230 moving between the app servers and a database as further described later. In some embodiments, a message broker may be implemented on a physical server, and the broker uses the local physical server memory (for example, DRAM) to implement a message queue for temporary storage of messages. In one embodiment, a Qpid-based Message Queue system may be implemented using two Qpid broker hosts in which the physical queues reside, per each production instance of a cloud-based system. A message queue host may implement, for example, 6,000 queues, depending on physical memory size.

A broker queue may comprise thousands or even hundreds of thousands of individual memory slots. These numbers are not critical. They will vary with different implementations of the broker, broker server memory, etc. Individual message formats and contents may be specific to the message type. A broker queue may be a shared message type queue; that is, it may include messages of different types and/or tenants. We refer to messages from different services or programs as having different message types. In other words, the message type indicates the service or feature that is the source of a message. The illustrated system may implement a shared message type queue in the sense that no one message type has its own exclusive queue.

A message broker 202 stores messages on its shared message type queue 300 generally at least until they are delivered or otherwise removed. However, in some cases, for example where actions are scheduled far in advance, a message queue may be used both as a long term data store and as a queuing and scheduling engine. Even if a flood of incoming messages is not severe enough to cause the messaging brokers to malfunction, the flood may adversely impact the response time of other tenants in a multi-tenant environment. Multitenancy refers to a principle in software architecture where a single instance of the software runs on a server, serving multiple client-organizations, or tenants. In a multitenant environment, such as cloud computing, a software application is designed to virtually partition its data and configuration, and each client organization, or tenant, works with a customized virtual application.

One method of monitoring message queue depth involves maintaining a message queue depth cache ("MQDC"). Other systems and methods may be used, for example, querying each broker for its current queue depth when the need arises. This may be done with a JMX query, for example. In a currently preferred embodiment, a message queue cache system is provisioned that maintains a cache that stores the current (or last known) message queue depth for each broker. The cache system may query the brokers periodically to update the cache. For example, the system may queries the brokers every 2-5 minutes. This interval is not critical; it may vary with the number of brokers, message queue sizes, and various other system parameters. The frequency of updating the cache may vary for different systems and requirements. The update frequency may be configurable. The update frequency may be tuned or optimized based on actual production experience.

Figure 3:
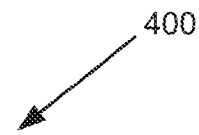
FIG. 3 is a conceptual illustration of a message queue depth cache in accordance with some implementations.

FIG. 3 is a simplified illustration of one example of an entry in a message queue depth cache 400. In the example, the MQDC 400 may store, for each update (timestamp), a list of entries (or rows) each comprising, a broker name or ID, a queue name, and corresponding queue depth. Preferably, the MQDC may be distributed by providing a local copy of it in each application server 100. In this way, the app server may use that data in consideration of the server's utilization of the message brokers. The MQDC may be distributed across the application servers, for example, using a "memcached" framework, an open source distributed memory caching system.

Figure 4:
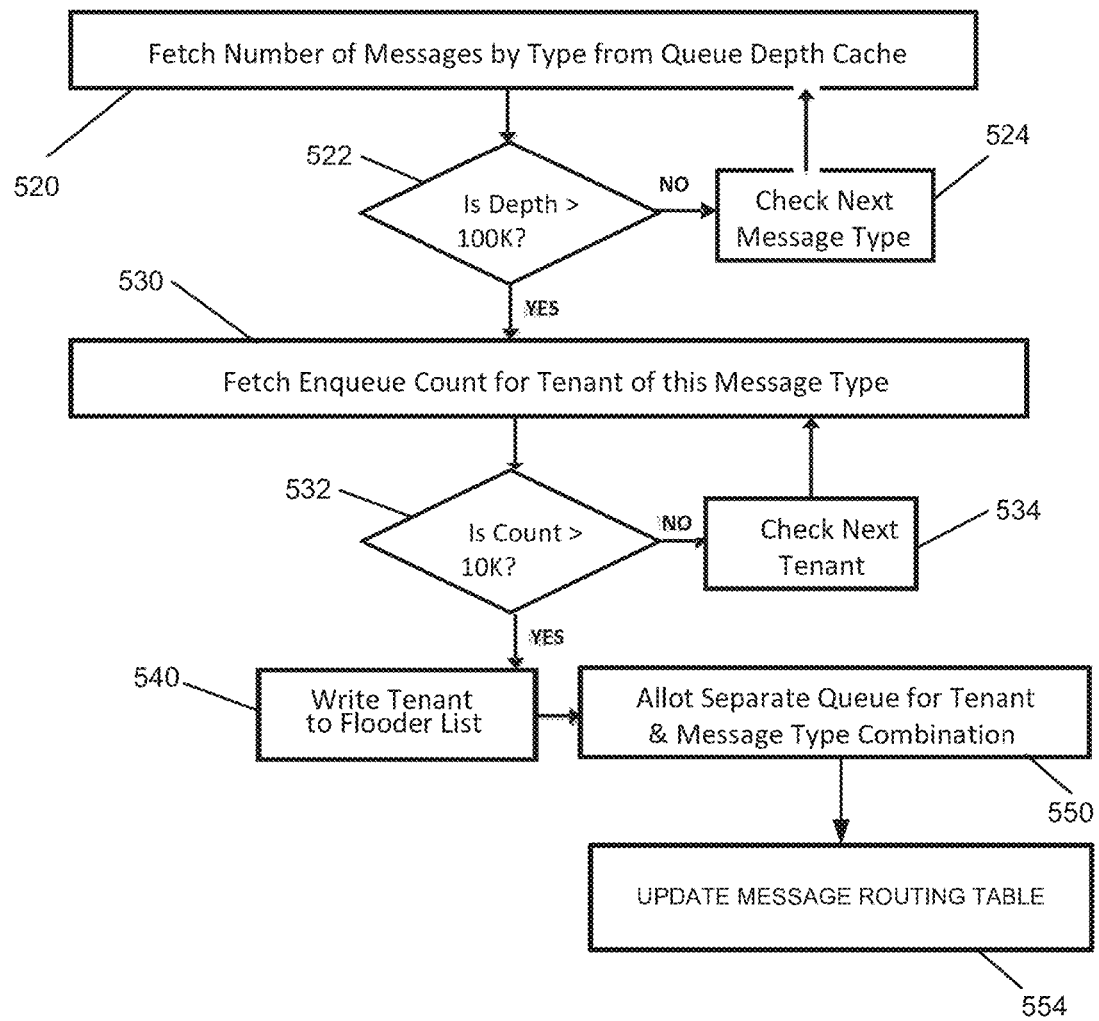
FIG. 4 is a simplified flow diagram illustrating a process in accordance with some implementations for managing message queues in a database system having a message queue system that includes queues shared by multiple message types and/or tenants.

FIG. 4 is a simplified flow diagram illustrating a process in accordance with some implementations for managing message queues in a database system having a message queue system that includes queues shared by multiple message types and/or tenants. The method may be implemented, for example, as a periodically scheduled job. It may be scheduled, for example, to run every three minutes on a large system. A frequency of running the job may be determined empirically, with the goal of achieving timely warning ahead of message flooding, without imposing undue overhead to guard against flooding. In FIG. 4, the illustrated method begins by fetching a count of messages for a first message type, block 520. This may be done for all in-use broker queues. Preferably, this data may be acquired from a message queue depth cache (see FIG. 3), or a similar resource. In an alternative embodiment, the message counts (queue depth) may be acquired by querying the message brokers.

Next, the process of FIG. 4 determines whether the current count or queue depth of the first message type is greater than a selected message queue depth or threshold, decision 522. For illustration only, a threshold depth of 100 k messages is shown. This number is not critical; other values may be used. The threshold depth may be selected or varied based on empirical data. The queue depth and enqueue rate thresholds may be tuned to fit a collection of workloads.

If the count is not greater than the threshold depth, the process proceeds to check the next message type, block 524. If the next message type count also does not exceed the depth threshold, the process again proceeds to block 524, and loops back to 520 to fetch the next message type count, and so on. In some embodiments, the MQDC may push the queue depth data to the flood detector. In some embodiments, a queue depth nearing or exceeding the limit may trigger a message to alert the flood detector of that condition.

Referring again to decision 522, if the queue depth for a particular message type exceeds the threshold depth, it indicates that the quantity of messages of the corresponding message type may adversely impact overall system performance. We call this a flooding queue. In that case, the process continues to block 530 and fetches enqueue count data for tenants associated with the message type that is exceeding the threshold. The enqueue count may indicate a number of new messages over a given time period, for example, 10,000 messages over the past 30 minutes (implying an "enqueue rate" of around 333 messages per minute). In practice, because the rate is not constant, and it is not checked continually, the enqueue rate is typically an estimate rather than an exact figure. The enqueue threshold count may be configurable. It may be based on empirical data, selecting a value that will identify a likely "flooder" while minimizing the likelihood of false positives.

In the case that the enqueue count exceeds a predetermined enqueue threshold value, decision 532, the process identifies the responsible tenant, and adds it to a "flooder list," block 540. The flooder list entry, in this example, is a message type-tenant combination. This may be called Tenant Level Flooding. If the enqueue count does not exceed the enqueue threshold count, decision 532, the process checks the next tenant, block 534, looping back to block 530 to fetch the enqueue count for the next tenant, and so on. The system tracks enqueue counts and works to ensure that the counts are good estimates without hurting performance. For example, in one embodiment we use an intermediate, smaller time window compared to the look-back period (e.g., 3-minute windows for the 30-minute look-back)—each time the flood detection job runs, it will look at the data from the last 10 windows. This allows us to maintain a good estimate of the counts in the past 30 minutes at any point in time. Another aspect, in one embodiment, is having each app server gather local data (i.e., recent number of messages enqueued from that server), and then periodically (e.g. every 2 minutes) having each server flush its recent data to a distributed store (such as memcached), which has the cumulative data that the flood detection job will look at. This keeps enqueue performance high and each enqueue event quick, since an enqueue thread needs to update local data only and does not need to go to the network.

When a flooder is added to the flooder list, block 540, the process attempts to "split" the message type-tenant's messages into a different queue, i.e., allocate a separate or dedicated queue for that message type-tenant combination, block 550. (Since the system operates in a multi-tenant system, it is important that we isolate the traffic from flooders into physically different queues, so that messages from other message types or tenants are not adversely impacted, e.g., stuck behind the messages of a flooder in the same queue.) Preferably, the dedicated queue is selected from queues that are currently unused or have a low message count, if one is available. Then, the allocation may be implemented by updating message routing, block 554. Extant messages that meet these criteria (now associated with flooders) may be moved from the flooding queue to the new dedicated queue. New messages of this message type-tenant combination preferably will not be routed to the dedicated queue; rather, they may be routed to supplemental storage in a database to relieve memory and CPU pressure on the messaging brokers. See 232 in FIG. 2. Later, as described below, these messages may be periodically swept back into the regular queues in a controlled manner. Allocations may be reflected in a routing table of rules.

To summarize, in a preferred embodiment, we consider a message type & tenant combination to be flooding ("tenant level flooding") if: (1) It is routed to one of the flooding queues OR one of the message type level flooder queues, and it has a high recent enqueue count (above 10000 in the last 30 minutes, configurable); OR (2) It is routed to one of the flooding queues, and the queue is dedicated for that tenant and message type only. Even if it doesn't have a high recent enqueue count, it's only the tenant and message type combination that can be responsible.

Message Type Level Flooding

In some cases, a certain message type may be flooding across many different tenants. Accordingly, a preferred flood detector also looks for message type level flooding. We consider a message type to be flooding if there is a dedicated queue for this message type, and the queue depth is very high (for example, above 200,000, configurable). In that case, a dedicated queue may be allocated to the message type.

More generally, this enables a process to detect cases where the queue has been built up to have very high depth, and the process has not succeeded in resolving the issue by splitting off tenant queues for tenant flooders on the message type and spinning their messages to disk. So this aspect also catches the cases where the high queue depth is due to one or more tenant flooders, or the message type across multiple tenants, having enqueued many messages in the past and are processing them very slowly, leading to a substantial backup. In a preferred embodiment, we implement different thresholds for tenant specific queue vs shared message type level queues—a shared queue can have message traffic from other message types and/or tenants, not just from the flooder, so we don't want to be overly strict when we consider its queue depth in deciding whether flooding is still a problem.

A routing table is an intermediate layer between the messaging brokers and application servers. It tracks metadata for facilitating the transport of messages belonging to each message type and/or tenant to physical queues on the messaging broker. See U.S. Patent Application Pub. No. 2014-0075445 entitled, "Mechanism for providing a routing framework for facilitating dynamic workload scheduling and routing of message queues for fair management of resources for application servers in an on-demand services environment," published on Mar. 13, 2014 and incorporated herein by this reference.

Figure 5:
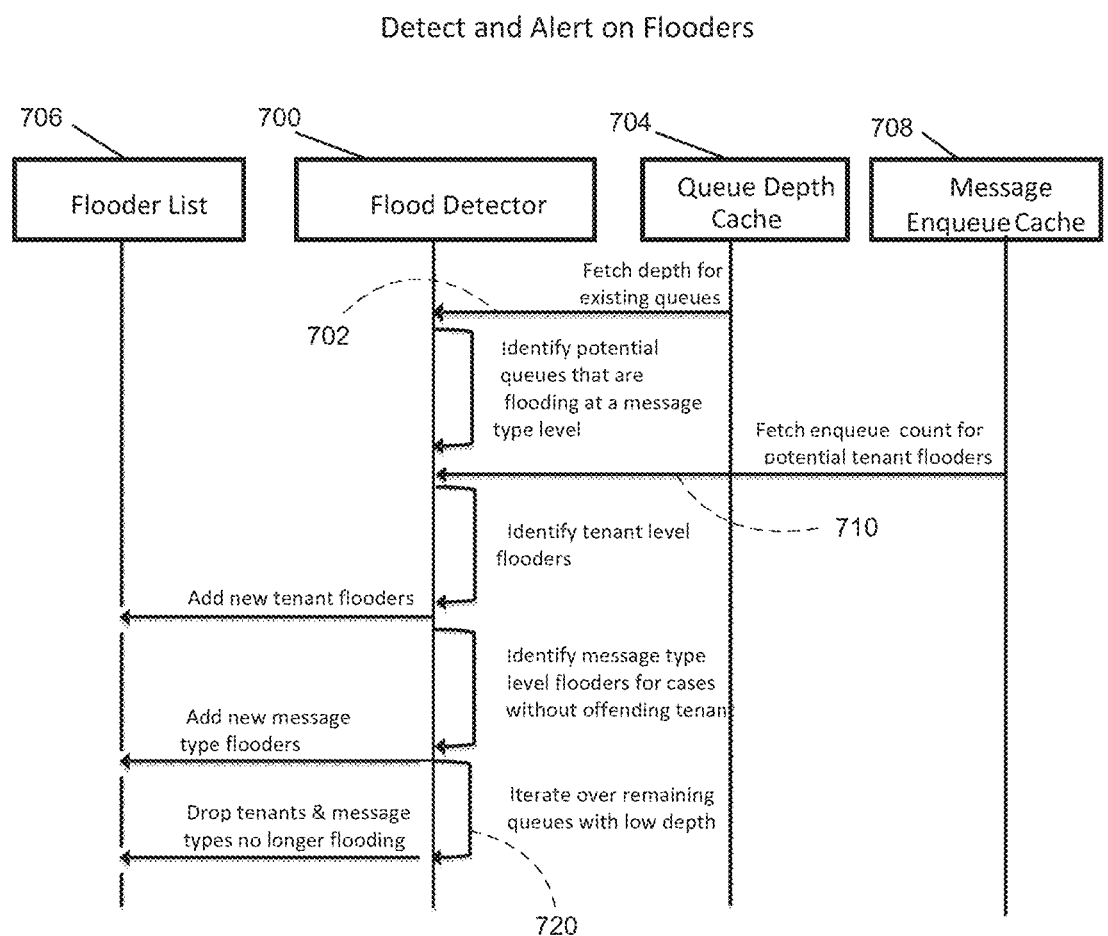
FIG. 5 is a temporal process diagram illustrating interactions among certain entities in connection with detect and alert operations in accordance with some implementations.

FIG. 5 is a process diagram further illustrating interactions among certain entities in connection with detect and alert operations in accordance with some implementations. In this diagram, time elapses from top to bottom. Thus, the first action at line 702 illustrates a flood detector component 700 fetching depth information for exiting queues from a queue depth cache 704. Based on that data, flood detector 700 identifies queues that potentially are flooding at a message type level. Next, the flood detector fetches enqueue counts for potential tenant flooders, see 710. Preferably this may comprise obtaining enqueue counts for only the potentially flooding message types. From this information, the flood detector identifies tenant level flooders as discussed above, and adds new flooders to a flooder list 706. The flood detector may further identify message type level flooders for cases that flood across multiple different tenants. These message type flooders also may be added to the flooder list as indicated. Finally, the flood detector may iterate over remaining queues with low depth, see 720, to find those no longer flooding, as further discussed below. These may be dropped from the list as further described below.

Figure 6:
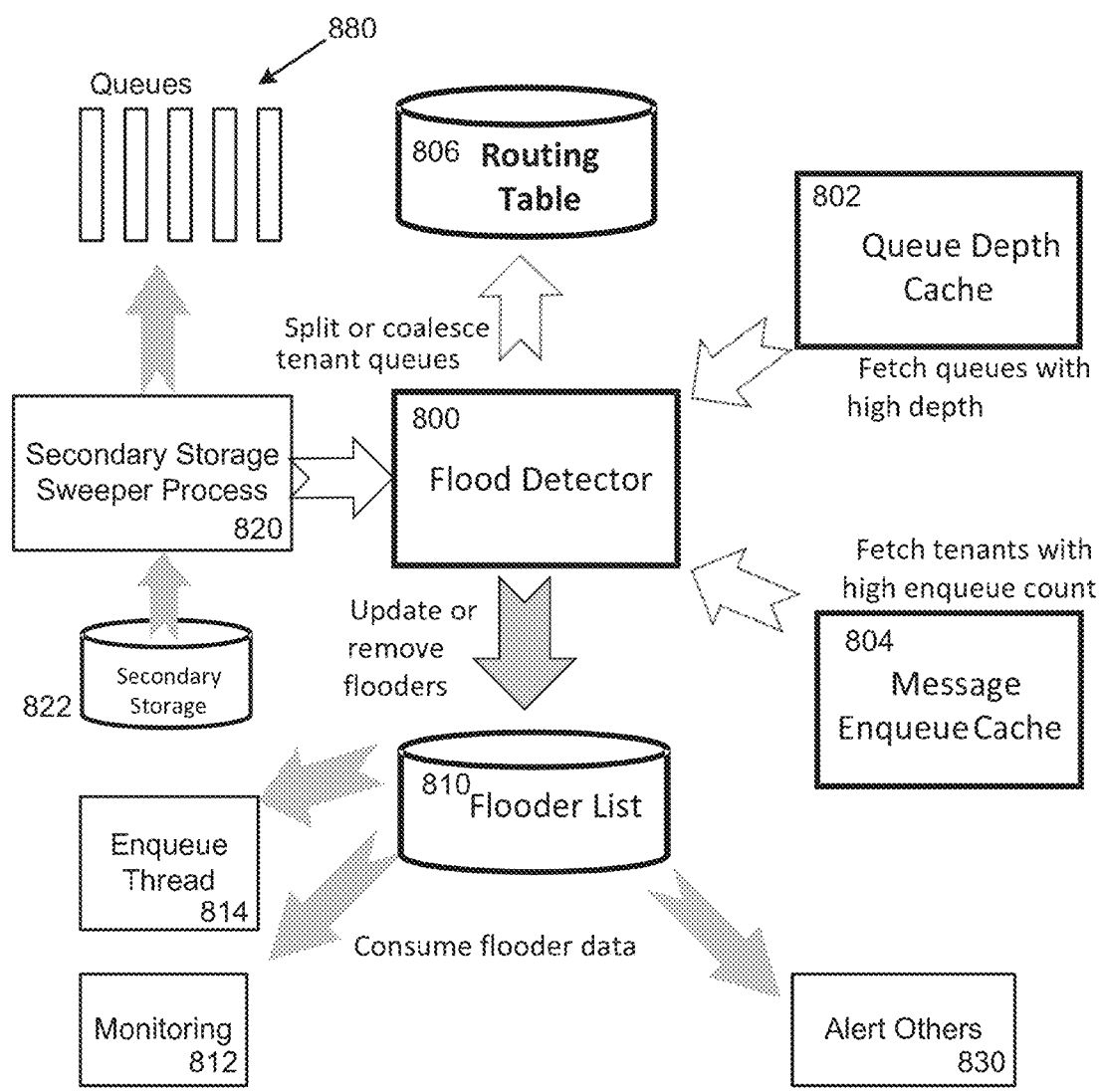
FIG. 6 is a block diagram of a system for managing message queues in a database system in accordance with some implementations.

FIG. 6 is a block diagram of a system for managing message queues in a database system in accordance with some implementations. A flood detector component 800 preferably is implemented in software, using any appropriate language. It communicates with a queue depth cache 802, as discussed above, and also with a message enqueue cache which may store recent enqueue counts, to determine which message types and/or tenants are flooding the message queues. The flood detector component 800 further communicates with a routing table 806 to split or coalesce tenant and/or message type queues when it detects that a flooding problem has begun or ended. By "split" we include allocation of a dedicated queue to a flooder, which may include migrating messages from the first (potentially flooding) queue to the dedicated queue, as discussed above. By "coalesce" we include deallocating a split queue when the message type or tenant that the queue is dedicated to is no longer considered a flooder, so that new traffic from the message type or tenant will go back to a shared queue. This is done because we may have a limited number of available queues on the brokers, so we need to ration and utilize queues in an intelligent manner.

The flood detector 800 further communicates with a flooder list 810 to update the list (mainly add or remove flooders). The flooder list informs any enqueue thread 814 of whether a new message belongs to a flooder and should be sent to the secondary storage instead of a broker queue. This allows us to protect the brokers' resources and stop sending new messages from flooders to the brokers when there is a flooding problem. To ensure good performance when enqueueing messages, each application server may read the flooder list periodically (for example, once every 3 minutes in a large system) and store a copy of the list in memory, so that any enqueue thread can quickly look up the flooder list from the local copy each time.

A secondary storage sweeper process 820 may be used for sweeping messages from secondary storage 822, into the appropriate queues 880. The sweeper may be scheduled to run periodically, or it may be triggered to run or not run under specific conditions, for example, when the system detects that a tenant or message type is no longer flooding. {+} In a preferred embodiment, we query messages from the secondary store and send them to broker queues in a controlled manner and in small batches (e.g., 100 messages), where each batch contains messages from a selected message type and tenant combination. Batching ensures that the recovery work can be check-pointed and committed in reasonable sizes and we can respond quickly to changes in system health; for example, if the database CPU becomes high or broker memory usage is nearing capacity, we can stop in a timely manner. In a preferred embodiment, we continue sweeping a message type and tenant combination's messages to its broker queue only if the broker heap usage is not high and the broker queue's depth is not high (for example, 50000 or under, configurable), since we do not want to flood the broker again. Furthermore, each job run may keep track of which message type and tenant combinations have been completely swept, i.e., the combinations with no more messages in the secondary store to sweep, which may be put in a distributed store (such as memcached) at the end of the job run. Then when the flood detection job runs, it may have this information available to help determine which message types and/or tenants are no longer flooding, as discussed below.

The flooder list 810 further can be used to inform other monitoring operations, block 812. The flooder list also can be disseminated and used to alert others, for example, manual operators (so they can shield the service) and other software components (so they can throttle or block new incoming messages), block 830.

Return to Normal Operations when Flood Recedes

Figure 7:
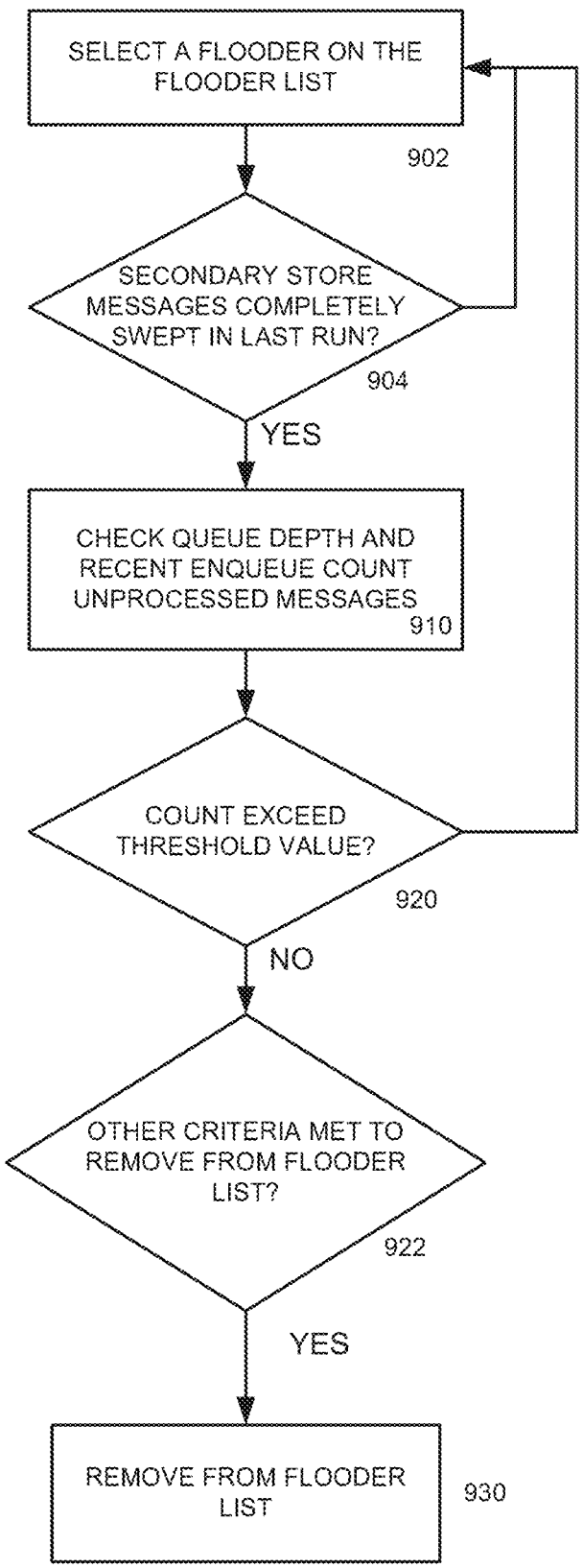
FIG. 7 is a simplified flow diagram of a process in accordance with some implementations for returning to normal messaging queue operations after flooding subsides.

FIG. 7 is a simplified flow diagram of a process in accordance with some implementations for returning to normal messaging after flooding subsides. This process may begin by selecting a flooder on the flooder list, block 902. Next is to determine that the flooder does not have many unprocessed messages built up, which can be in either the secondary store or on a broker queue. A preferred embodiment does so by considering only flooders whose secondary store messages have been completely swept in the last sweeper run (i.e., there were no more messages to sweep), see decision 904. This information may be stored in a distributed store (such as memcached) by the secondary store sweeper: for each run, it may store in memcached the set of flooders whose messages it was able to fully sweep, i.e., in the last batch, the number of messages swept was lower than the batch size, so there were no more messages to sweep for that flooder. If the sweeper stopped sweeping for a flooder because of other reasons, e.g. the flooder is suspended or the broker heap is high, it will not be in this list.

For flooders where there were no messages left in the secondary store right after the last sweeper run, the next step is to assess unprocessed messages. The current total number of unprocessed messages for a flooder may be estimated as its queue depth on the brokers plus a number of messages enqueued since the last sweeper run. See block 910. For recent enqueue count, for example, the enqueue count may be acquired from memcached say, over the last 30 minutes or a selected time period. It may be a time period used to periodically check for flooders. For the broker queue depth, it may be stored for tenant flooders with a dedicated queue. For tenant flooders assigned to a shared queue, this process may use its shared queue's depth, but compare it against a higher threshold than we do for a dedicated tenant queue. In one embodiment, the threshold values may be on the order of those below. These are merely illustrative and not limiting: The threshold may be 5000 for tenant flooders with a dedicated queue, and it may be 50,000 for other tenant flooders and for message type flooders assigned to shared queues. The process of FIG. 7 then compares the unprocessed message counts to the corresponding threshold values, decision 920. The recent enqueue count for a message type flooder may include all enqueues for that message type and tenant. If all criteria are met, the flooder is removed from the flooder list, block 930.

When a flooder is removed from the flooder list, if a split queue had been allocated for the flooder, then the routing table 806 may be notified that the split queue can be coalesced, as discussed above.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. A computer-implemented method for managing message queues in a database system having a message queue system that includes queues shared by multiple message types and tenants, the method comprising:
   detecting a message flooding condition in the message queue system;
   identifying a source of the message flooding condition as a flooder;
   allocating a dedicated message queue to the flooder, wherein the dedicated message queue is implemented in local physical memory of a server in the database system;
   diverting the flooder's message traffic to the dedicated message queue; and
   responsive to the flooding condition subsiding, de-allocating the dedicated message queue and routing the flooder's message traffic normally.

2. The method of claim 1 wherein the message queue system includes a plurality of message brokers operable in one or more message queue broker hosts, and identifying the flooder includes:
   fetching queue depth counts of messages in the message queue broker hosts by message type;
   detecting a specific message type for which the queue depth count exceeds a predetermined threshold value;
   identifying a sender of the specific message type;
   estimating an enqueue rate of new messages coming from the sender of the specific message type; and
   in the case that the estimated enqueue rate exceeds a predetermined enqueue threshold value, designating the sender as the source of the message flooding condition on a flooder list.

3. The method of claim 2 wherein the queue depth and enqueue rate thresholds are tuned to fit a collection of workloads.

4. The method of claim 2 wherein the flooder is an individual tenant of the database system.

5. The method of claim 2 wherein the flooder is a specific message type and the specific message type is flooding across multiple tenants.

6. The method of claim 2 wherein the flooder is a combination of one or more message types associated with a specific rac node.

7. The method of claim 2 wherein diverting the flooder's message traffic includes storing new messages from the flooder to secondary storage on disk outside of the heap memory of message queue broker hosts.

8. The method of claim 2 including updating a routing table to re-route the flooder's message traffic to the dedicated message queue.

9. The method of claim 2 and further comprising:
persisting the flooder list to a database; and
disseminating the flooder list to app servers in the database system.

10. The method of claim 7 including moving messages from the flooding queue into the dedicated queue and routing new messages from the flooder to the secondary storage.

11. A system comprising:
a database;
a plurality of application servers configured for communication with the database;
a message framework interconnecting the database and the application servers;
the message framework including a plurality of message brokers implemented on message queue host servers, each host server having local physical server memory accessible to the message broker to implement a local message queue, and a flood detector component arranged to detect flooding on the message framework; and
wherein the flood detector is arranged to divert message traffic on the message framework from a flooder to a secondary message storage element in the database to relieve flooding on the message framework, the secondary message storage element physically separate from the local message queue.

12. The system of claim 11 including a routing table coupled to the flood detector to enable routing selected messages to a dedicated message queue to avoid flooding.

13. The system of claim 12 including a flooder list coupled to the flood detector and stored in a memory to store flooder data.

14. The system of claim 13 wherein the flood detector is configured to periodically check a flooder listed in the flooder list; and
if the flooder is no longer flooding the message framework, remove the flooder from the flooder list; and deallocate the dedicated message queue.

15. A computer program stored on a tangible medium for a database system for managing a message queue system to prevent message flooding from impacting system performance, the computer program comprising a set of instructions operable to:
detect a message flooding condition in the message queue system;
identify a source of the message flooding condition as a flooder;
allocate a dedicated message queue to the flooder;
divert the flooder's message traffic to the dedicated message queue to avoid impacting other message traffic; and
responsive to the flooding condition subsiding, de-allocate the dedicated message queue.

16. The computer program as recited in claim 15, wherein the message queue system includes a plurality of message brokers operable in one or more message queue broker hosts, and the instructions for identifying the flooder are operable to:
fetch queue depth counts of messages in the message queue broker hosts by message type;
detect a specific message type for which the queue depth count exceeds a predetermined threshold value;
identify a sender of the specific message type;
estimate an enqueue rate of new messages coming from the sender of the specific message type; and
in the case that the estimated enqueue rate exceeds a predetermined enqueue threshold value, designate the sender on a flooder list as the source of the message flooding condition.

17. The computer program as recited in claim 16 including identifying the flooder as one of a specific message type, a specific tenant, a message type-tenant combination, and a message type-cluster combination, the cluster comprising a specific cluster of servers cooperating as a single system.

18. The computer program as recited in claim 17 wherein the instructions are further operable to store the queue depth counts in a distributed cache and disseminate the queue depth counts to multiple application servers via the distributed cache.

19. The computer program as recited in claim 16 wherein the instructions are further operable to periodically recheck to determine whether an existing flooder is no longer flooding; and, in the case that the flooder is no longer flooding, remove the flooder from the flooder list.

20. The computer program as recited in claim 19 wherein the periodic recheck includes the steps of:
checking the corresponding queue depth count for a flooder on the flooder list,
checking whether all messages in the secondary store for that flooder were swept in the last sweeper run; and
checking a recent enqueue rate for the flooder; and then,
in the case that (a) the corresponding queue depth count is below a predetermined low depth count, (b) all messages in the secondary store for that flooder were swept in the last sweeper run, and (c) the recent enqueue rate is below a predetermined maximum enqueue rate, removing the flooder from the flooder list.

* * * * *